:::: {.columns}
::: {.column}
3,440,184
AQUEOUS DISPERSION OF AN ADMIXTURE OF A HIGH AND LOW STYRENE LATEX, A MELAMINE-FORMALDEHYDE RESIN AND AN INORGANIC FILLER, AND METHOD OF FOAMING SAME
Robert E. Erickson, Midland, and Edwin L. Wittbrodt, Auburn, Mich., assignors to The Dow Chemical Company, Midland, Mich., a corporation of Delaware
No Drawing. Filed Oct. 6, 1966, Ser. No. 584,644
Int. Cl. C08f *47/08, 43/08;* C08g *37/32*
U.S. Cl. 260—2.5       8 Claims

ABSTRACT OF THE DISCLOSURE

The invention relates to an aqueous dispersion of (a) about 25 to 50 parts by weight of a high-styrene latex, (b) from about 50 to 75 parts by weight of a low styrene latex, and for each 100 parts by weight of total latex solids, (c) from about 2.5 parts to about 10 parts by weight of a water dispersible melamine-formaldehyde resin and (d) from about 40 parts to about 150 parts by weight of a finely divided filler, and the method of foaming the aforesaid composition to produce a foam having improved shock-absorbing properties.

---

This invention relates to synthetic latex foam. Especially, it relates to latex foams having improved shock absorbing properties.

It is known to blend synthetic latex compositions with natural rubber latex for the manufacture of foam rubber (see E. W. Madge, "Latex Foam Rubber," Interscience Publishers, N.Y., 1962, pages 190–212). It is shown for example at page 209 of the above reference, as to hysteresis and resilience values, that blends give intermediate values between values for 100 percent natural rubber latex and values for 100 percent cold rubber synthetic latex: Blends of conventional styrene-butadiene latexes having high and low percentages of styrene are also known, for example as described in Chemical Abstracts 62, 6653ᵃ (1965). Such latexes are coagglomerated and concentrated before further processing to prepare latex foam rubber. More recently, new synthetic latex foams (prepared from latexes of copolymers having reactive groups and from added compositions coreactive therewith) have been described in U.S. 3,215,647. The latexes which are operable to prepare these newer synthetic latex foams do not coagglomerate by the methods used with the earlier conventional synthetic latexes for foams and thus the prior blending-agglomeration techniques are not operable.

It has now been discovered, and this discovery is the subject of this invention, that synthetic latex foam products having improved shock absorbing qualities are obtained by blending two latexes of specified compositions, from about 2.5 parts to about 10 parts of a water-dispersible melamine-formaldehyde resin and from about 40 parts to about 150 parts of a finely divided inorganic filler per 100 parts of total latex solids, foaming the resulting aqueous composition to an extent to provide a density, dry foam basis, of from about 10 to about 13.5 pounds per cubic foot, curing and drying the resulting wet foam structure.

One of the two latexes which are required to form the desired aqueous composition contains a copolymer of from about 70 percent to about 84 percent by weight of a styrene compound, from about 15 percent to about 25 percent by weight of an aliphatic conjugated diene, and from about 1 percent to about 5 percent by weight of an
:::
::: {.column}
$\alpha,\beta$-ethylenically unsaturated aliphatic carboxylic acid. For brevity and convenience, such a latex sometimes hereinafter is referred to as a high-styrene latex. The other latex contains a copolymer of from about 36 percent to about 45 percent by weight of a styrene compound, from about 54 percent to about 60 percent by weight of an aliphatic conjugated diene, and from about 1 percent to about 4 percent by weight of an $\alpha,\beta$-ethylenically unsaturated aliphatic carboxylic acid. This other latex sometimes is referred to hereinafter as a low-styrene latex. In the blend comprising the latexes, there are used a sufficient amount of the high-styrene latex to provide from about 25 parts to about 50 parts by weight of latex solids and a sufficient amount of the low styrene latex to provide from about 50 parts to about 75 parts by weight of latex solids for each 100 parts of total latex solids, all calculations being on a dry basis.

The latexes operable in the practice of this invention are prepared from ethylenically unsaturated monomers of at least three different kinds:

(1) A styrene compound;
 (2) An aliphatic conjugated diene, and
 (3) An $\alpha,\beta$-ethylenically unsaturated carboxylic acid.

By the term "styrene compound" is meant styrene per se and substituted styrenes, especially alkyl-substituted styrenes. Generally, the alkyl substituent is a lower alkyl group, i.e., an alkyl having from 1 to 4 carbon atoms. Representative styrene compounds are styrene, alpha-methylstyrene, p-vinyltoluene, o-vinyltoluene, p-tert-butylstyrene, ar-ethylstyrene, ar-dimethylstyrene and the like.

The aliphatic conjugated diene monomers generally have from 4 to 10 carbon atoms and are represented by isoprene; 3,4-dimethyl-1,3-hexadiene; 4,5-dimethyl-1,3-octadiene; and especially 1,3-butadiene.

The carboxylic acid monomers consists of the $\alpha,\beta$-ethylenically unsaturated acids. Representative examples are monocarboxylic acids such as acrylic acid, methacrylic acid, and ethacrylic acid; dicarboxylic acid such as maleic acid, fumaric acid, and itaconic acid; mono esters of dicarboxylic acids such as maleic half esters, fumaric half esters, itaconic half esters, and mixtures of any of the above.

The latexes are prepared from the prescribed classes of monomers, preferably by emulsion polymerization. However, solution polymerization or other polymerization methods may be used with subsequent conversion of the products to latex form. Alternative to the direct copolymerization of at least one monomer from each of the three classes of monomers, a copolymer may be prepared from the styrene compound and the aliphatic conjugated diene and onto such preformed polymer there may be graft polymerized the ethylenically unsaturated carboxylic acid or equivalent. Ordinarily, each of the latexes has a polymer solids content of from about 40 percent to about 70 percent, preferably from about 50 percent to about 65 percent.

The melamine-formaldehyde resins which are useful in the practice of this invention are the adducts of formaldehyde and melamine of sufficiently low molecular weight to be water-dispersible and the lower alkyl ethers, especially the methyl ether, of the above described melamine-formaldehyde adducts. The etherified (or alkylated) melamine-formaldehyde adducts may be partially or fully etherified, i.e., the hydroxymethyl substituent of the adducts may be partially or substantially fully converted to lower alkyl ether groups. Also mixtures of melamine-formaldehyde adducts having varying degrees of etherification may be mixed with each other or with
:::
::::

melamine-formaldehyde adducts having no ether substituents. The term "melamine-foraldehyde resin" is intended to include materials of the above description. Descriptions and methods of preparation of materials of this type are included in the Chapter VIII, "Condensations with Formaldehyde," in Schildknecht, Polymer Processes, vol. X of High Polymer Series, Interscience Publishers Inc., New York, pages 295–350.

The fillers which are used in the practice of this invention are finely-divided inorganic fillers which find utility in other latex foam compositions. Specific examples are clay, calcium carbonate, talc, mica and lithophone. The finely divided inorganic fillers are used in the present invention in an amount from about 40 parts to about 150 parts per 100 parts of latex solids, all parts being by weight. Outside these ranges inferior and unacceptable results are obtained.

In the practice of this invention, the preparation of latex foam products typically follows the general procedure disclosed in United States Patent No. 3,215,647. The foam formulations necessarily contain the two kinds of latexes described herein, the melamine formaldehyde resin, and the filler. Often such formulations also include other added components such as foam stabilizers, pH controlling agents, foaming aids, thickeners, and antioxidants. The foam formation, i.e., the blend of latexes, coreactive material (melamine-formaldehyde resin), filler and optimal additional ingredients, in foamed or frothed to a density of from about 10 to about 13.5 pounds per cubic foot (dry basis) by one of the various methods such as by blowing agents, or by whipping or by use of apparatus having commercially available foam heads. The composition, after the foaming or frothing has taken place often is called "wet froth." The wet froth suitably is coated on a substrate to which it will adhere or onto a surface which has been treated with a release agent such as with polytetrafluoroethylene; for example, a thus-treated belt or other similarly treated substrate. Alternatively, the wet froth may be placed in molds or spread on a flat tray.

Early effects of the interaction of the latex components and the melamine-formaldehyde resin (sometimes called gelling or gelation because of the paucity of short, descriptive language) assist in holding the frothed composition in its cellular form from the frothing step until subsequent drying and curing, usually by the application of heat, result in the desired foam product. Drying and curing usually is carried out at temperatures from about 300° F. to about 400° F. for from about 5 to about 90 minutes.

Among the uses for shock absorbing foams are padding materials for automobiles such as in sun visors, arm rests, instrument panel crash pads and the like. A significant test of the suitability of potential padding materials is provided by an impact test which measures the peak deceleration imparted to a moving weight having a hemispherical contact surface by a rigidly mounted specimen of the padding material. In the results reported in the examples below, the peak deceleration values are shown in gravitational units ("G's"). To be acceptable for a padding material in automotive uses, a specimen must have a G value of less than about 800 and preferably less than about 600. The impact test is carried out and measured as follows:

The specimen is mounted in a rigidly held backing plate. An aluminum mass having a hemispherical contact surface and an effective weight of 10 pounds is caused, while moving at a velocity of 15 miles per hour, to contact the mounted specimen. The peak deceleration is measured by an appropriately calibrated linear accelerometer. (Statham Linear Accelerometer, Model ASA-2700.)

The following examples illustrate how the invention may be practiced but are not to be construed as limiting its scope. In the examples, all parts and percentages are by weight unless otherwise specified.

Examples 1–6

Shock absorbing foam structures are prepared from the following formulation:

| Blend A | Parts (dry basis) | Parts (wet basis) |
| --- | --- | --- |
| Low styrene latex [1] | See table I | |
| High styrene latex [2] | See table I | |
| Melamine-formaldehyde resin [3] | 7.5 | 11.3 |
| Sodium lauryl sulfate | 2.0 | 6.7 |
| Filler [4] | 100 | 100 |
| Silicone fluid | 1.0 | 1.0 |
| Methyl cellulose | 0.25 | 10.0 |

[1] A latex of a copolymer of 42 parts of styrene, 56 parts of 1,3-butadiene and 2 parts of acrylic acid.
[2] A latex of a copolymer of 78 parts of styrene, 20 parts of 1,3-butadiene and 2 parts of acrylic acid.
[3] A water-soluble mixture of partially methylated, low-molecular weight melamine-formaldehyde adducts having an average of about 0.8 mole of methylol groups and about 1.8 mole of methoxymethyl groups for each mole of melamine.
[4] Waterwashed alkali aluminum silicate (67.5% silica ($SiO_2$), 19.4% alumina ($Al_2O_3$)).

The latex components are blended, and then all the components are added in the order listed above with thorough mixing after each addition. The resulting latex foam compound is foamed by mechanical beating (Hobart Mixer, Model N–50 equipped with a modified beater) for sufficient time and speed to produce the foam density shown for each example in Table I (for instance, in Example No. 4, 40 seconds at No. 3 speed and 2 minutes at No. 1 speed of the specified Hobart Mixer). The resulting wet froth is cast between ¼ inch bars on a release substrate, i.e., a glass fiber mat coated with polytetrafluoroethylene, and treated for 30 seconds with an infra red heating unit followed by drying and curing in a circulating air oven at 325° F. until the internal foam temperature reaches 310° F. (approximately 20 minutes). The resulting sheets of foam are used to prepare specimens of appropriate size for testing. The results are shown in Table I wherein the peak "G" force is obtained as described supra.

TABLE I

| Example No. | Latex blend Low styrene parts, dry basis | Latex blend High styrene parts, dry basis | Filler parts | Foam density, lbs./cubic foot | Peak "G" force |
| --- | --- | --- | --- | --- | --- |
| 1 | 70 | 30 | 100 | 10.7 | 550 |
| 2 | 70 | 30 | 100 | 12.6 | 500 |
| 3 | 70 | 30 | 50 | 10.8 | 560 |
| 4 | 65 | 35 | 100 | 12.3 | 450 |
| 5 | 60 | 40 | 100 | 12.0 | 350 |
| 6 | 75 | 25 | 50 | 11.4 | 750 |
| A [1] | 70 | 30 | 100 | 9.5 | 1,000+ |
| B [1] | 70 | 30 | 100 | 14.3 | 1,000+ |
| C [1] | 70 | 30 | 15 | 10.7 | 2,000+ |
| D [1] | 60 | 40 | 100 | 14.0 | 2,000+ |
| E [1] | 75 | 25 | 50 | 9.4 | 1,000+ |
| F [1] | 80 | 20 | 50 | 10.4 | 1,000+ |
| G [1] | 80 | 20 | 50 | 8.2 | 2,000+ |

[1] Not examples of the invention.

That which is claimed is:
1. An aqueous dispersion especially adapted for the preparation of shock absorbing latex foam containing as the essential constituents:
   (a) from about 25 parts to about 50 parts by weight, dry basis, of a high-styrene latex,
   (b) from about 50 parts to about 75 parts by weight, dry basis, of a low-styrene latex, and for each 100 parts by weight of total latex solids,
   (c) from about 2.5 parts to about 10 parts by weight of a water-dispersible melamine formaldehyde resin and
   (d) from about 40 parts to about 150 parts by weight of a finely divided inorganic filler;
   said high-styrene latex being an aqueous colloidal dispersion of a copolymer of from about 70 percent to about 84 percent by weight of a styrene compound, from about 15 percent to about 25 percent by weight of an aliphatic conjugated diene and from about 1 percent to about 5 percent by weight of an $\alpha,\beta$-ethylenically unsaturated aliphatic carboxylic acid and said low-styrene latex being an aqueous colloidal dispersion of from about 36 percent to about 45 percent by weight of a styrene compound, from about 54 percent to about 60 percent by weight of an aliphatic, conjugated diene and from about 1 percent to about 4 percent by weight of an α,β-ethylenically unsaturated aliphatic carboxylic acid.

2. The aqueous dispersion of claim 1 in which the styrene compound is styrene.

3. The aqueous dispersion of claim 1 in which the aliphatic conjugated diene is butadiene.

4. The aqueous dispersion of claim 1 in which the carboxylic acid is acrylic acid.

5. A method for the preparation of shock absorbing foam comprising the steps of:
   (a) preparing a blend of from about 25 parts to about 50 parts by weight, dry basis, of a high-styrene latex, from about 50 parts to about 75 parts by weight, dry basis, of a low styrene latex and for each 100 parts by weight, dry basis, of latex from about 2.5 parts to about 10 parts by weight of a water-dispersible melamine formaldehyde resin and from about 40 parts to about 150 parts by weight of a finely divided inorganic filler;
   (b) foaming the resulting blend to form a wet froth having a density of from about 10 to about 13.5 pounds per cubic foot, calculated on a dry basis;
   (c) curing and drying the wet froth; said high-styrene latex being an aqueous colloidal dispersion of a copolymer of from about 70 percent to about 84 percent by weight of a styrene compound, from about 15 percent to about 25 percent by weight of an aliphatic conjugated diene and from about 1 percent to about 5 percent by weight of an α,β-ethylenically unsaturated aliphatic carboxylic acid and said low-styrene latex being an aqueous colloidal dispersion of from about 36 percent to about 45 percent by weight of a styrene compound, from about 54 percent to about 60 percent by weight of an aliphatic, conjugated diene and from about 1 percent to about 4 percent by weight of an α,β-ethylenically unsaturated aliphatic carboxylic acid.

6. The method of claim 5 in which the styrene compound is styrene.

7. The method of claim 5 in which the aliphatic conjugated diene is butadiene.

8. The method of claim 5 in which the carboxylic acid is acrylic acid.

References Cited

UNITED STATES PATENTS

| | | | |
|---|---|---|---|
| 3,107,224 | 10/1963 | Rogers et al. | 260—29.7 |
| 3,215,647 | 11/1965 | Dunn | 260—2.5 |
| 3,238,172 | 3/1966 | Talalay et al. | 260—2.5 |

MURRAY TILLMAN, *Primary Examiner.*

MORTON FOELAK, *Assistant Examiner.*

U.S. Cl. X.R.

260—29.4, 29.7, 39, 41.5, 852, 894